C. L. Crowell,
Upsetting Tires.
No. 49,387.  Patented Aug. 15, 1865.
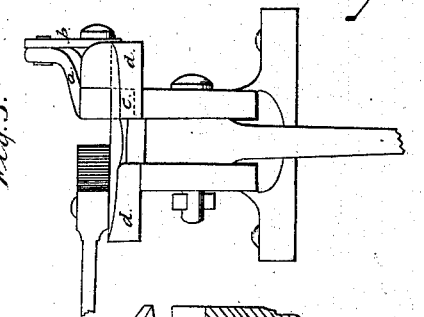
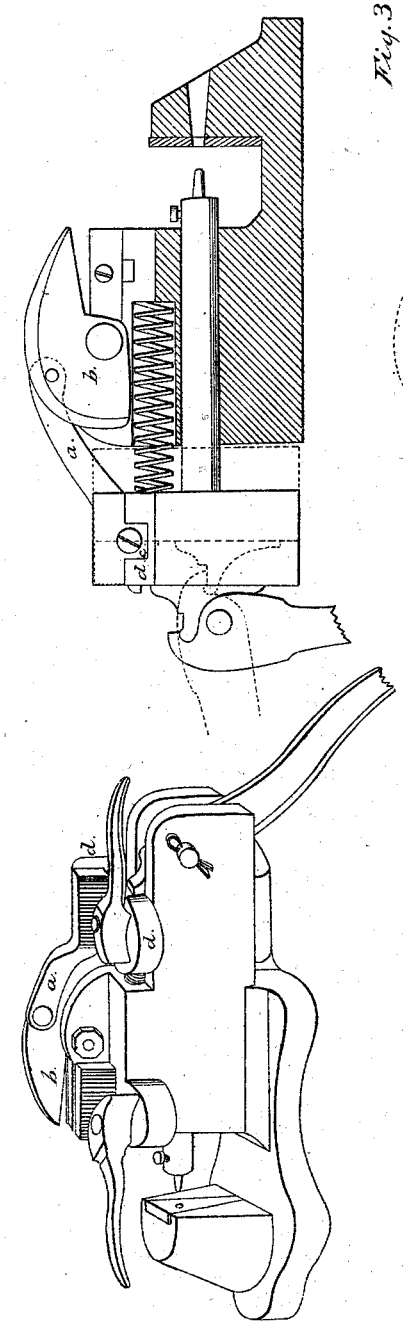
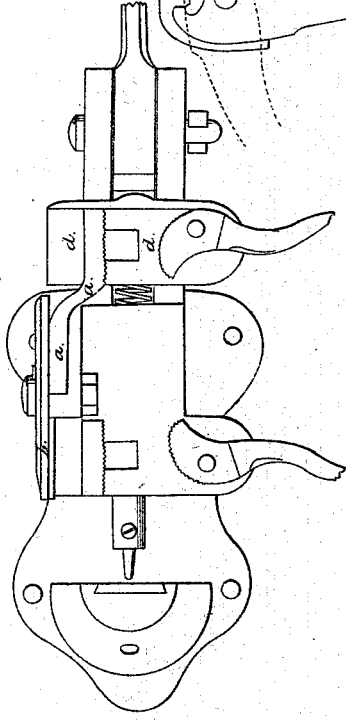
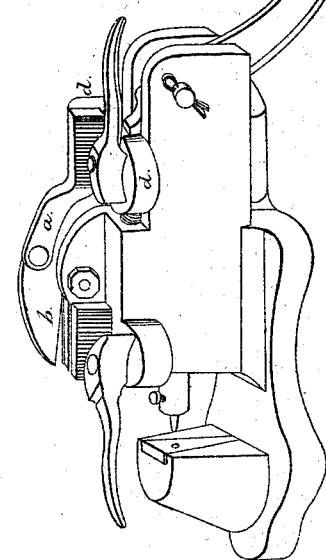

UNITED STATES PATENT OFFICE.

CHAUNCEY L. CROWELL, OF PEORIA, ILLINOIS.

IMPROVEMENT IN TIRE-MACHINES

Specification forming part of Letters Patent No. 49,387, dated August 15, 1865.

*To all whom it may concern:*

Be it known that I, CHAUNCEY L. CROWELL, of the city and county of Peoria, and State of Illinois, have invented a new and useful Improvement on the Machine for Upsetting Tires for which Letters Patent were issued by the United States to Robert Smith and myself, numbered 24,009, and dated May 17, 1859, a full description of which is given in the specification attached to and made a part of the said Letters Patent, and the same is hereby referred to and made part hereof; and I do hereby declare that the following is a full, clear, and exact description of the construction and operation of the same, reference being had to the annexed drawing, making a part of this specification.

A description of my improvement consists in a metal plate attached by a screw or bolt to the projecting lip of the fixed clamp, as shown by the drawing, and a shear, which is also attached to the same projecting lip, which turns on a pivot near the center of the shear.

The connecting-bar $a$ is made fast at one end to the top of the shear $b$, and the other end is made fast to the movable clamp $d$ by means of a shank, $c$, which enters a groove in the movable clamp $d$, and made fast by a screw passing through the projecting lip and entering the shank, which keeps it in its place, the lever, intermediate slide, movable jaw, the movement and action of each being the same in all respects as described in said patent for said machine for upsetting tire, and as shown by the drawing hereto annexed.

The drawing marked A shows the connecting-bar and shear disconnected from the tire-upsetter.

I do not claim a patent for the tire-upsetter, punch, lever, movable slide, and shear, nor for either of them separately.

What I claim as of my improvement, and for which I desire Letters Patent, is—

The bar $a$, which connects the shear with the movable slide, as shown and described.

CHAUNCEY L. CROWELL.

Witnesses:
O. E. ROOT,
J. C. LOLLIOTT.